United States Patent [19]

Galloway et al.

[11] Patent Number: 5,672,278

[45] Date of Patent: Sep. 30, 1997

[54] METHOD AND SYSTEM FOR SUPPRESSION OF FOAM OF WASTE STREAMS

[75] Inventors: Terry R. Galloway, Berkeley; Thomas J. Green, San Leandro, both of Calif.

[73] Assignee: The Scientific Ecology Group, Inc., Oak Ridge, Tenn.

[21] Appl. No.: 435,148

[22] Filed: May 5, 1995

[51] Int. Cl.$^6$ .................................................. B01D 19/04
[52] U.S. Cl. ........................... 210/696; 210/697; 210/698; 202/264; 202/265; 252/321
[58] Field of Search .................................. 210/696, 697, 210/698; 202/264, 265; 252/321

[56] References Cited

U.S. PATENT DOCUMENTS

| | | | |
|---|---|---|---|
| 1,559,218 | 10/1925 | Barbet | 202/264 |
| 2,103,635 | 12/1937 | DeWitt | 202/264 |
| 2,231,544 | 2/1941 | McCorquodale, Jr. et al. | 202/264 |
| 2,416,360 | 2/1947 | Ambrose et al. | |
| 2,482,307 | 9/1949 | Walker et al. | |
| 4,510,249 | 4/1985 | Redikultsev et al. | 435/289 |
| 4,863,702 | 9/1989 | Galloway et al. | |
| 4,874,587 | 10/1989 | Galloway | |
| 5,078,888 | 1/1992 | Penticoff et al. | 210/639 |
| 5,156,706 | 10/1992 | Sephton | 202/264 |

OTHER PUBLICATIONS

Osipow, Lloyd I., *Surface Chemistry, Theory and Industrial Applications*, Chapter 12, "Foams," pp. 344–376, Reinhold Publishing Corporation (1962).

Perry, Robert H. and Cecil H. Chilton, *Chemical Engineers' Handbook*, Fifth Edition, "Gas–in–Liquid Systems," pp. 18–93—18–96 (1973).

EPA Memorandum of Sep. 30, 1991 from Sylvia Lowrance, Dir., Solid Waste to Allyn M. Davis, Dir., Region 6.

*Primary Examiner*—W. L. Walker

[57] ABSTRACT

A method and a system is disclosed for the suppression of foams during the processing of streams containing waste materials. An additive is introduced into a waste stream and the waste stream is processed for a period of time at an elevated temperature and substantially atmospheric pressure. The tendency toward foam formation is suppressed by particles from the additive becoming suspended in the waste stream. The waste materials containing a substantial reduction of foam are removed from the processing system without the usual spattering and formation of sticky residue which causes fowling and frequent shutdowns of the processing system.

14 Claims, 2 Drawing Sheets

METHOD AND SYSTEM FOR SUPPRESSION OF FOAM OF WASTE STREAMS

This invention relates generally to a method and system of suppressing foams. More particularly, the invention relates to a method and system for the suppression of foams in the processing of liquid or slurry streams containing waste materials which are to be destroyed.

BACKGROUND OF THE INVENTION

The basic surface-chemistry of foams, bubbles of gas having thin liquid film walls, are well known; see Osipow, Lloyd I., Surface Chemistry, Theory and Industrial Applications, pages 344–376, Reinhold Publishing Corporation (1962). However, there has been little recent work on the suppression of foams; see Perry, Robert H. and Cecil H. Chilton, Chemical Engineers' Handbook, Fifth Edition, pages 18–93 through 18–96 (1973). Foams, i.e., stable gas-in-liquid dispersions, will usually form where a gas is dispersed in a liquid in the presence of natural or synthetic surface active agents, e.g., surfactants.

Chemical defoamers that are added to gas-liquid dispersions to expedite the destruction of foams are either soluble in the liquid of the foam system or essentially insoluble. Representative of the soluble defoamers include certain aqueous surfactants useful as chemical defoamers and can be the very same agents that promote foam formation; see Schwartz and Perry, "Surface Active Agents," Vol. I, Chap. 29, Interscience, New York (1949). Consequently, concentration of soluble defoamers in the foam system is critical to their success. The characteristics of low volatility, ease of dispersion, strong spreading power and surface attraction and orientation are usually found in insoluble defoamers. Such defoamers function by being concentrated in the film and thereby alter the stability of the film. Organo-silicon compounds are among the most effective of the defoamers. Standard defoamers consisting of surface active agents which couple the foam-formers and high temperature components, such as silica, are carried into the foam to destabilize it.

U.S. Pat. No. 2,416,360 teaches the use of a stable fine dispersion of liquid organo-germanium oxide condensation products as defoamers for lubricating oils. The criticality of such products is that the amount added to suppress the foam does not deleteriously modify the desirable properties of the final product.

U.S. Pat. No. 2,482,307 teaches a method of suppressing the formation of synthetic elastomer lattices. An aqueous emulsion is used as the foam suppressor consisting of a water immiscible organic solvent solution of a stable polymeric dimethyl silicone including oils and greases. The emulsion is in the form of particles having a size of at least 2 μm. It is important that the small adverse effect these silicones may have on the treated latex products is easily overcome by the addition of other materials. For example, the silicone-treated lattices tend to lower the viscosity and wetting power, which can be overcome by the use of common thickening agents.

The criticality of each of the foregoing patent methods does not exist with the additives of the method of the present invention since they remain in the waste materials which are disposed and have no further utility.

Despite the wide use of a variety of foam suppression methods available in the industry, at present there is no known economical method of suppressing foam in particularly difficult systems in the processing of waste streams.

The current method to deal with the problem of waste stream foams is simply to lower the throughputs of the waste streams. An especially serious problem with foaming occurs in the removal of liquid from hazardous waste streams such as certain organic compounds, chemical and biological warfare weapons, and low and high level radioactive waste. The shipment of such waste to processing or disposal sites creates significant danger of environmental release in the event of an accident. Methods and systems are available to efficiently dispose or reduce the volume of such toxic waste at the site where the waste is located.

Every nuclear power generating plant now regularly has their steam-generators cleaned by pumping a diammonium ethylenediaminetetraacetic acid ($NH_3$-EDTA) cleaning solution through the system during spring and fall planned, preventative maintenance shutdowns. There is an extremely strong need for technologies that can accomplish the destruction of EDTA steam-generator cleaning solutions on-site. Such cleaning solutions constitute a mixed radioactive, hazardous waste mixture. At the present time, there does not exist any commercial waste processing facility in the U.S. that can safely handle such waste streams.

One of the well-known critical problems with concentrating EDTA solutions is its natural tendency to form large quantities of foam. Therefore, the EDTA-containing foam produced during such nuclear power plant cleaning is radioactive and is carried along the piping systems, plugging equipment, sensors, and the like. The foaming problem is particularly acute during the final stage when a heated screw evaporator is used to evaporate off all of the liquid. Suppressing this foam increases the capacity, improves the quality of the finished, concentrated radioactive residue, and makes for a more steady processing operation and control. The finished residue is typically about 30 times volume-reduced from the EDTA waste feed. Thus, this waste residue contains all of the radioactivity of the waste stream feed, but it is now concentrated about 30 times. This residue is in an acceptable interim storage form until the Nuclear Regulatory Commission (NRC) and the U.S. Congress approves for operation a final radioactive waste storage repository. When such a national repository has been approved and becomes commercially available, this interim storage form can be reprocessed into the final waste form, i.e., vitrified bricks, glass "jewels", special concrete, and similar forms to meet the future requirements. The waste residue contains no objectionable compounds that preclude reprocessing into the final approved disposal form.

Such methods of processing radioactive waste streams are in contrast to the use of incinerators. The burning hazardous waste has become unacceptable throughout the U.S. any many other parts of the world. Incinerators that meet current air pollution laws and have efficient operation tend to be relatively large and therefore may not be economically feasible for placement at facilities where toxic waste is generated. Moreover, incinerators are often difficult to control and create strong community and political ill-feeling. Perhaps more importantly, however, the incineration process may produce other toxic products which are themselves undesirable and which are difficult or impossible to eliminate.

In U.S. Pat. No. 4,874,587, issued Aug. 26, 1987 and assigned to the assignee of the present invention, a process and apparatus are described for hazardous waste detoxification by steam reforming which represent a significant improvement over incinerators. In the aforesaid patent, a reactor is described in which toxic destruction levels of 99.99% or more are achieved. The aforesaid process and apparatus are operated without air or free oxygen reaction and produce an effluent gas which is primarily comprised of carbon dioxide, hydrogen, carbon monoxide and water. The process and apparatus described in the aforesaid patent has been classified by the United States Environmental Protection Agency as "infrared heater" as differentiated from "incineration". Federal Register No. 57, No. 105, Aug. 25, 1992, pp. 38558–38564, EPA memorandum Sep. 30, 1991 from Sylvia Lowrance, Dir., Solid Waste to Allyn M Davis, Dir., Region 6.

A steam-reforming detoxification reactor operates to react a gaseous stream of toxic material with water in excess of the stoichiometric amount necessary to react with substantially all of the organic compounds in the stream of toxic waste. This reaction is carded out at a temperature in excess of about 1000° C. and results in an effluent gas stream of high temperature comprised primarily of carbon dioxide, water, and hydrogen but also containing low levels of carbon monoxide. The latter can be readily converted later to carbon dioxide by catalytic oxidation.

Since the principal reaction in a steam-reforming detoxification reactor occurs in the gas phase, the processing of waste where the waste material can be relatively easily gasified is fairly straightforward. For example, a system for vaporizing and gasifying toxic waste for feeding to a steam-reforming detoxification reactor wherein the toxic waste is liquid contained in a metal drum is shown and described in U.S. Pat. No. 4,863,702, issued on Sep. 5, 1989 and assigned to the assignee of the present invention. In the case of certain materials, such as viscous liquids and slurries, or more stable organic or inorganic compounds, however, conversion of the waste into a gaseous form for feeding to a steam-reforming detoxification reactor is not easily accomplished by the system described in the aforesaid patent.

A method and system for steam-reforming a liquid or slurry waste stream is disclosed and claimed in a copending patent application, U.S. Ser. No. 08/221/989, filed Apr. 1, 1994, the description of which is incorporated by reference herein. The application describes the use of a heated screw converter to steam reform the waste stream to a solid residue for disposal. The method of the present invention is designed to improve the operation of just such a screw converter.

SUMMARY OF THE INVENTION

The method of the present invention suppresses the natural tendency to form foams during the processing of waste streams, i.e., liquid streams containing waste materials which are processed, removed from the system and sent for disposal. A foam suppressing additive which has stability to withstand thermal and chemical degradation during the processing is introduced into the waste stream. The waste streams are processed for a period of time at a temperature in the range from about 95° C. (203° F.) to about 760° C. (1400° F.) and a pressure ranging from a vacuum to conventional high pressure, e.g. from about 50 Kilo Pascals (kPa) to about 3000 kPa. The processing may include nothing more than the non-reactive removal of volatile compounds by evaporation and distillation or the processing may include reactions, e.g., steam reforming.

During all such processing of waste streams, there is a strong tendency for the formation of a foam of the waste streams. After the step of introducing the additive into the waste stream and during the suppression of the foam, the additive exists in the form of particles having a size sufficient to become suspended in the waste stream. The foregoing phrase "suppression of the foam" is intended to embrace each of the following results: arresting this natural tendency to form a foam of the waste material, reducing the tendency of the waste stream to foam and eliminating altogether the foam after its formation. It is critical in the selection of the particular additive to be used in the present method to make sure that any portion of the additive that may become solubilized in the waste stream during the processing, the individual particles of the additive do not coagulate and precipitate out of solution. The resulting waste materials from processing containing a substantial reduction of foam are removed.

In one embodiment of the method of the invention, a liquid or slurry feed material is processed to derive an output residue of an altered character. The waste stream and foam suppressing additive are introduced and moved through an exposure region in a processing vessel in a path of predetermined length while circulating a gas stream through the feed material from a gas input region to gas output region in a direction substantially counter to the direction of movement of the waste stream. In a specific embodiment, a synthetic gas (syngas) stream comprising steam, hydrogen, carbon dioxide and carbon monoxide can be used. In this embodiment, the predetermined length of the path is selected to result in conversion of at least a portion of the waste stream by a steam reforming reaction at a minimum temperature of 230° C. (450° F.) up to about 760° C. (1400° C.) and a pressure in the range of about 50 kPa to 1000 kPa with the gas in the gas stream. The gas stream introduced into the processing vessel, e.g., a reactor, of this invention can be from the gas output region of a steam-reforming detoxification reactor of the type described in U.S. Pat. No. 4,863,702 referred to in the foregoing, which description is incorporated by reference herein.

In another embodiment of the present invention, a pressurized gas stream, e.g., steam, steam/air, natural gas, recycled syngas and the like, under pressure, is also introduced to a screw processor to assist in the removal of foam spatter on the internals of the processor. In this embodiment, the gas stream introduced in the gas input region is an air stream in place of the syngas of the foregoing embodiment.

DESCRIPTION OF THE DRAWINGS

Advantages of the present invention will become apparent to those skilled in the art from the following description and accompanying drawings in which.

DETAILED DESCRIPTION OF THE INVENTION

Figure 1:
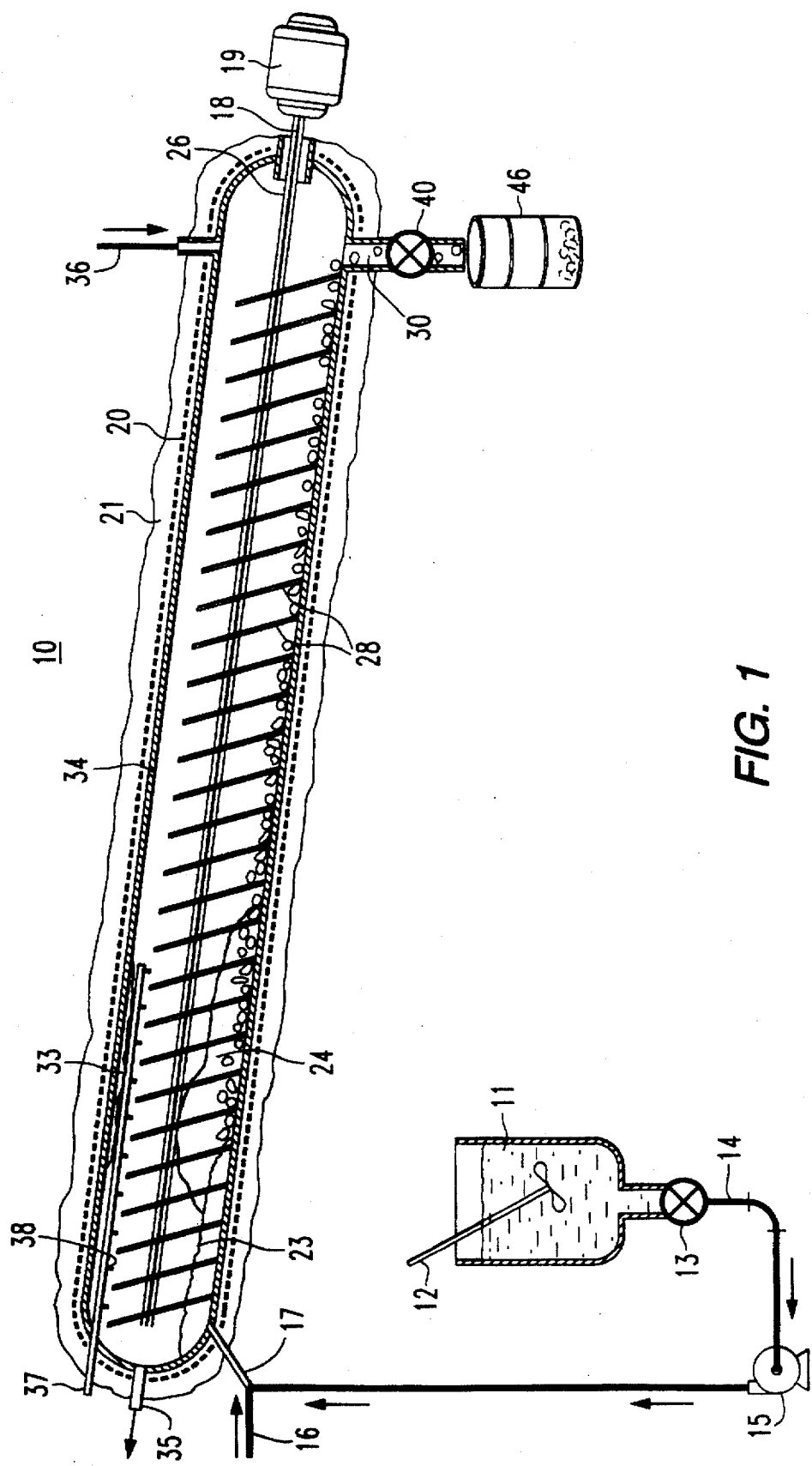
FIG. 1 is a schematic view, partially in cross-section, of a processing system using a heated screw evaporator in accordance with one embodiment for carrying out the method of the present invention.

FIG. 1 illustrates a specific embodiment of the method and system of the present invention in which heated screw evaporator (HSE) 10 operating at atmospheric pressure was used to exemplify one of many types of systems that could have been used to carry out the method of the present invention. Wheat flour (Gold Metal Brand) was added to agitated mixing vessel 11 containing a given quantity of waste stream consisting of a diammonium ethylenediaminetetraacetic acid ($NH_3$-EDTA) steam-generator cleaning solution at a concentration of approximately 1.2 pounds per gallon (12.5% by weight). The flour was thoroughly mixed, fully dispersed and partially dissolved in the given quantity of waste stream by means of agitator 12. The resulting emulsion of suspended particulate material within a quantity of the steam-generator cleaning solution was removed via rotating vane feeder 13. The emulsion was pumped through line 14 by means of pump 15 into which waste feed stream in line 16 was added. Pump 15 provided the necessary means to assure that the emulsion became well mixed and dispersed into the feed stream. The combined waste stream and emulsion was introduced into HSE 10, operating at pressures in the range of about 70 kPa to about 150 kPa, via waste feed inlet 17. HSE 10 was equipped with screw 18 and motor 19. The solution was heated to a temperature in the range of about 538° C. (1000° F.) by means of electrical heaters 20 within insulation layer 21. During the first approximately 45% of the length of HSE 10, a substantial portion of the liquid pool was evaporated as the pool moved along HSE 10 from liquid boiling region 23, through foam formation region 24 to dry residue region 25. After the pool became crystallized and the solids precipitated between regions 24 and 25, screw 18 carried the resulting solids along toward outlet 30. Screw 18 included shaft 26 and a plurality of flights 28.

Figure 2:
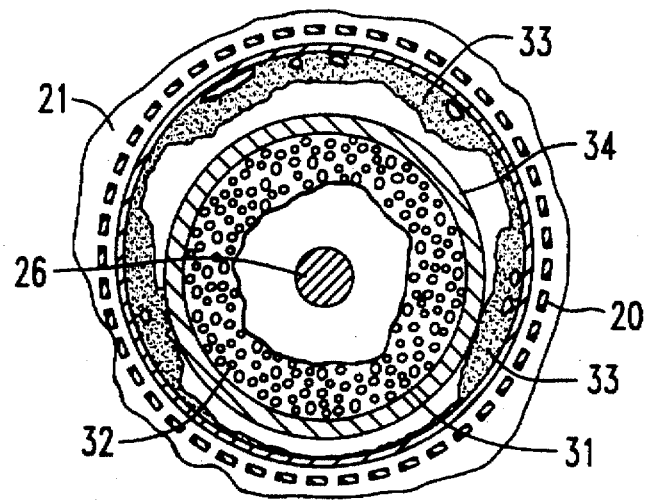
FIG. 2 is a schematic cross-sectional view of the foam region of the processing system to show the build-up on one flight of the screw of the heated screw evaporator.

FIG. 2 shows a cross-sectional view of HSE 10 of FIG. 1 to show the build-up of deposits on one of the flights 28 and the other internals in foam formation region 24. Flights 28 of a typical helical screw are shown in FIGS. 1 and 2 in schematic form such that the individual flight is represented as a flattened disk in FIG. 2. The thick and gooey deposits 31 are shown adhering to the outer circumference of flight 28 and the light-colored bubbly and thin deposits 32 are shown building up on deposits 31 adjacent shaft 26. Spatter deposits 33 are shown deposited on internal side walls 34 of HSE 10. Additional details of the conditions for these deposits are set forth below.

In the embodiment illustrated in FIG. 1, steam and air were introduced through gas inlet 36, flowed countercurrent to the flow of feed material entering through waste feed inlet 17 and exited through gas outlet 35. The solids residue fell through outlet 30 by gravity into valve lock hopper 40. The solids were loaded into residue drum 46 for disposal by conventional means.

The mechanism for foam suppression is complex and involves not just surface chemistry. First, the suspended particulates of the particular additive used in the present method acted as a nucleating site to enhance and make more uniform the boiling action occurring in the processing vessel. This nucleation in itself seems to spread the boiling out over a larger heat transfer surface area such that the vapor velocity can lift and carry away the foam along during processing of the waste stream within the processing vessel is reduced. It also appears that uneven or unsteady state boiling aggravates the formation of foam. In addition, these sudden bursts of foam formation created periods of excess vertical velocity, which carried the foam upward and into the main flow along the path of the waste stream through the processing vessel.

Examples of suitable additives for the present method include sawdust, corn meal, flour, titanium dioxide, molybdenum disulfide, sand fines, grinding compounds, clays, polishing compounds, cellulose acetate and mixtures thereof. The polishing compounds suitable for this method are the fine grit used in the fine polishing of the exterior surfaces of vehicles. Flour is intended to mean any finely ground material including wheat, fish, bananas, dehydrated potatoes and any other vegetable material suitable for being finely ground.

Another mechanism that appears to be important and working in the present method is the foam destabilizing role of the fine particulates in the foam itself. The particulate fines of the particular additive that are used are suspended in the liquid cells between the bubbles that make up the fundamental foam structure itself. Although not to restrict the theory of the mechanism of the present method, it is apparent these particulate fines act as ionic or polar sites (arising from clay-like charged platelets, or broken grains with polar surfaces) that attract and neutralize the native and synthetic surfactants creating and thus stabilizing the foam. The additive is in the form of a powdered solid material and is suspended in a suitable liquid to form an emulsion. The size of the powdered additive is substantially less than 100 μm, preferably less than 5 μm, and still more preferably in the range of about 0.5 μm to about 5 μm. Suitable liquids include water, oils, solvents, and solutions and/or emulsions of such liquids. Preferably the liquid is the same as the liquid making up the slurry of the waste stream. The additive assists in the avoidance of a sticky-gummy phase during processing.

In the specific embodiment shown in FIG. 1, but prior to the introduction of the additive, sticky-gummy phase 31 and bubbly and thin phase 32 adhered to the flights 28 of screw 18 in foam region 24 as shown in FIG. 2 and heated screw steam-reforming reactor 10 became plugged. In addition, the liquid of the waste slurry 33 spattered onto and adhered to the internal side walls 34 of HSE 10 along the path of the material within foam region 24 of HSE 10.

As shown in FIG. 1, HSE 10 includes steam manifold 37 which consisted of steam jets 38 directed toward internal side walls 34 and down onto screw flights 28 for the steam removal of any spatter build-up on the flights and internals of HSE 10.

Figure 3:
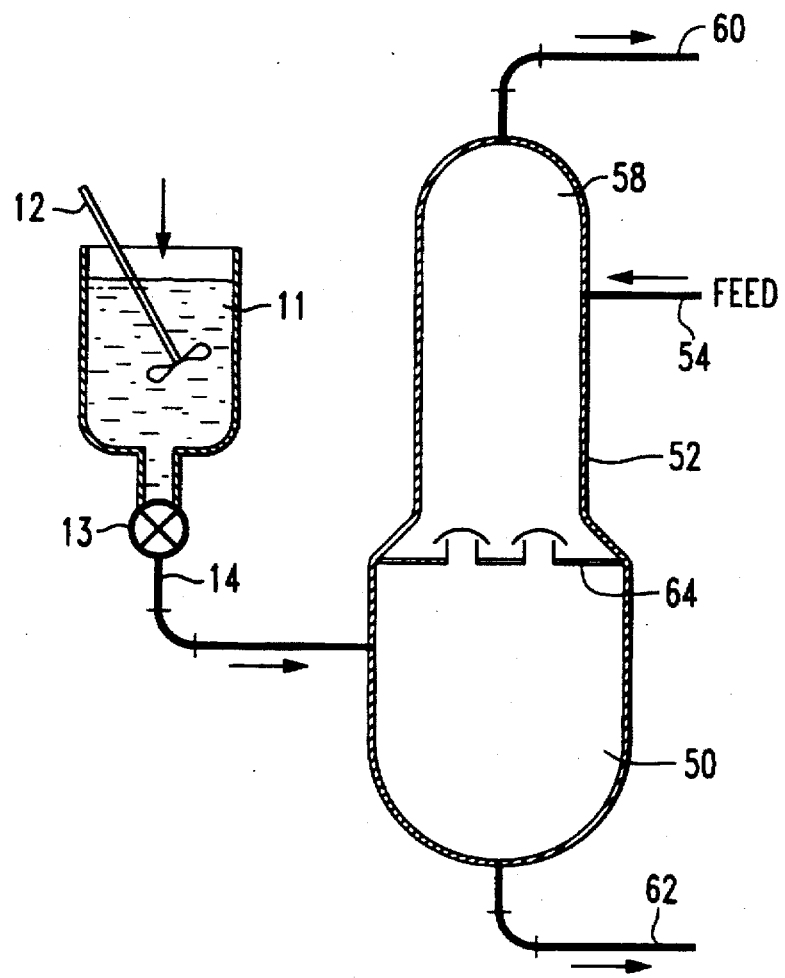
FIG. 3 is a schematic view, partially in cross-section, of a processing system using a distillation column in accordance with another embodiment for carrying out the method of the present invention.

Referring now to FIG. 3, a suitable foam suppressing additive in powdered form is added to agitated mixing vessel 11 containing a waste stream at a concentration of no greater than 70% by weight. The powdered additive is emulsified in the waste stream by means of agitator 12 and added to reboiler section 50 of distillation column 52. A waste stream is passed into column 52 via line 54 such that the concentration of the additives is in the range of about 0.5 to about 20% by weight. The volatiles are distilled off and pass through upper section 58 and through line 60. The waste residue containing the additive is removed from the reboiler section through line 62 to be discarded or sent for further processing. The additive causes a suppression of foam in reboiler section 50, prevents entrainment of any foam beyond tray 64 and increases throughput through column 52.

The foregoing mechanisms, and maybe others not fully explored at this time, have been observed in the laboratory experiments set forth below.

Control Test

This laboratory experiment consists of a control test in which no additives were added to serve as a basis for all of the examples which follow. A 825 grams (1.9 lb.) stainless steel pot, was used to prepare a synthetic mixture from a 1% calcium-Versene cleaning solution having an apparent density of about 1 gm/ml, i.e., 45% EDTA/55% water (1.2 sp. gr.) containing 1 wt. % $CaCO_3$. 200 ml of this synthetic solution were placed in separate 500 ml Erlenmeyer flasks with water for use in a number of laboratory hood boiling tests. The first flask, used as the control, was then placed on a large hot plate and preheated at a setting half-way between low and medium. The flask began to briskly boil in 7 min., at which point the hot plate setting was increased to between medium and high. The boiling of the water proceeded for an additional 21 min., at which point the boiling temperature began to increase to a temperature of 120° C. (248° F.) with the volume decreasing to 150 ml. After a total elapsed time of 33 min., the solution in the flask became viscous. After a period of 37 min., the material in flask had the viscosity of maple syrup. After 3 more min., the initiation of foaming commenced with large bubbles and the volume of liquid in the flask was reduced to 110 ml. After a total time of 41 min., the bubble volume of the foam increased to 200 ml over the small volume of the remaining solution. The solution had a temperature of 177° C. (350° F.) and had the viscosity and the straw-yellow color of Karo® syrup. After a total time of 47 min., the temperature reached 204° C. (400° F.), the bubbles were brown in color, the solution was dark gold in color, and the foam had reached the original liquid level of 200 ml. At this point, the foam began to increase markedly, such that after a total time of 52 min. the foam grew from 250 to 400 ml at 217° C. (423° F.) and in one more min. the foam had reached 500 ml at 228° C. (443° F.). Finally after 40 min. from the start of this control experiment, no more boiling of the solution occurred, the foam remained at 500 ml and the temperature of solution was about 232° C. (450° F.).

EXAMPLES 1 AND 2

In Examples 1 and 2, various amounts of "fine" redwood sawdust were added to each of the flasks containing the 200 ml of the Ca-Versene solution used in the Control. The sawdust was gathered from the floor of a circular Skill® saw operation at a lumber supplier (Truitt & White of Berkeley, Calif.).

In Example 1, 25 ml (5.2 grams) of the sawdust were added to the flask containing 200 ml of the 1% Ca-Versene feed stream to result in a slurry containing about 2.5% by weight sawdust. The flask and its contents were placed on the hot plate at a time of 1453 hrs. At 1500 hrs., the contents began to boil at a temperature of 107° C. (224° F.) with a light boiling action, which caused sufficient agitation to maintain the particles of sawdust in suspension. At 1505 hrs. and a temperature of 114° C. (237° F.), there was a light vigorous boiling with light foam and smaller bubbles. By 1519 hrs, and at 146° C. (295° F.), the foaming was not as high or as thick as in the previous test. The remaining liquid was already getting viscous. The foam volume was measured at 175 ml. By 1525 hrs. at 201° C. (394° F.), the light foam began to change character and grow to 200 ml while the remaining syrup was of a lava-like consistency. From 1525 to 1526 hrs., the temperature climbed from 211° C. (411° F.) to 252° C. (488° F.) with foam still at the 200 ml. level. At 1542 hrs. and at 354° C. (670° F.), the foam level was lower and the test ended with no more boiling. Therefore, it was shown that at an additive concentration of about 2.5% by wt. of the additive in the feed, the use of sawdust effectively reduced the level of foam over the control.

In Example 2, 50 ml (10.4 grams) sawdust were added to the flask containing 0.75% Ca-Versene resulting in a slurry containing about 5.0% by weight sawdust. The flask placed on the hot plate to bring it to a boil with agitation using the same procedures used in Example 1. In this example, substantially no "EDTA-type" foam was formed in the range from about 193° C. (380° F.) to about 218° C. (425° F.) that was observed to form in Example 1. Two other significant differences occurred in this example in comparison to that of Example 1. During Example 2, the boiling of the contents of the flask occurred without splatter and the final paste which resembled "brownies" was not sticky and did not adhere to a glass stirring rod. These latter results are particularly important because the additive allows the waste stream to be processed without fouling the internals, especially the region of the processing vessel above the waste stream. In addition, the waste stream can be reduced to a solid residue without sticking in and blocking the equipment. Thus it was shown that at a concentration of about 5% by wt., the use of sawdust as an additive substantially suppressed any formation of foam.

EXAMPLES 3 THROUGH 12

In Example 3, 15 cc of cellulose acetate were mixed with 5 cc glycerine, 30 cc distilled vinegar and 5 cc isopropyl alcohol in the same type of 500 ml Erlenmeyer flasks with the same type of agitation that were used in Examples 1 and 2. The resulting slurry of cellulose acetate was added to 90 cc of Versene (45% EDTA/55% water) and boiled over a propane torch. A thin white crust with a small celled foam was immediately formed. The volume in the flask at this point in the boiling process was twice the original volume.

In Example 4, 15 cc of cellulose acetate were mixed with 30 cc vinegar and 5 cc isopropyl alcohol to form a slurry which was added to the flask containing 90 cc of Versene as in Example 3. Substantially the same results were obtained in this example except that the bubbles were larger, i.e., about 0.63 cm (¼ in.) and no foam was formed.

In Example 5, 15 cc of cellulose acetate were mixed with 30 cc ammonia to form a slurry which was added to the flask containing 90 cc of Versene as in Example 3 and brought to very vigorous boiling. Substantially the same results were obtained in this example except that the bubbles were even larger, i.e., about 1.27 cm (½ in.), no foam was formed, and the volume in the flask increased to 3 times that of the original volume.

In Example 6, 15 cc of cellulose acetate were mixed with 30 cc diethylene glycol to form a slurry which was added to the flask containing 90 cc of Versene as in Example 3. A similar thin, white crust was formed in this example which broke into clumps as the boiling was continued. After vigorous boiling, large, i.e., about 1.27 cm (½ in.), bubbles formed without foam and the volume in the flask increased to 3 times that of the original volume.

In Example 7, 15 cc of cellulose acetate were mixed with 30 cc vinegar to form a slurry which was added to the flask containing 90 cc of Versene as in Example 3. A similar thin, white crust was formed in this example which broke into clumps as the boiling was continued. After vigorous boiling, large, i.e., about 0.63 cm (¼ in.), bubbles formed without foam and the volume in the flask increased to 2 times that of the original volume.

In Example 8, 30 cc of cellulose acetate were mixed with 30 cc vinegar and 5 cc isopropyl alcohol to form a slurry which was added to the flask containing 90 cc of Versene as in Example 3. A thicker, white crust was formed in Example 8 than was formed in Example 3.

In Example 9, 5 cc of cellulose acetate were mixed with 15 cc vinegar and 2.5 cc isopropyl to form a slurry which was added to the flask containing 90 cc of Versene as in Example 3. A thick, white crust was formed and the volume in the flask increased to 3 times that of the original volume.

In Example 10, 30 cc of cellulose acetate were mixed with 60 cc vinegar, 10 cc isopropyl alcohol to form a slurry which was added to the flask containing 450 cc of Versene as in Example 3. Substantially the same results were obtained at this period of boiling except that a thin, white crust was formed and the volume in the flask increased to twice that of the original volume. After vigorous boiling, the color of the solution darkened and the volume increased to 3 times its original volume. The boiling continued until the volume increased to 4 times the original volume and a small celled foam was formed. The color darkened as the boiling continued and the foam collapsed with the volume returning to twice the original volume. During the final stages before the material in the flask completely solidified, it became even darker and very thick with puffs of vapor, but no spatter of liquid occurred. The final solidified mass had a volume about half that of the original volume.

In Example 11, the effect cellulose acetate in glacial acetic acid has on the suppression of foam in comparison to cellulose acetate in vinegar was studied. 100 ml Ca-EDTA (0.75% $Ca^{++}$) was heated to resolubilize the solids to a single phase liquid in a water bath at 82° C. (180° F.). Simultaneously, approximately 10 gm of cellulose acetate were mixed with 50 ml of glacial acetic acid in the same water bath. The two solutions were combined in a 500 ml Erlenmeyer flask and a substantial portion of the contents formed a thick, viscous gelatinous mass. The flask and contents were placed on a hot plate and heated in stages as described above to a final temperature of 204° C. (400° F.). Initially, the gelatinous portion separated from a low viscosity liquid and the liquid having a high water content boiled off in the temperature range of about 110° to about 116° C. (230–240° F.). The bubbles in the boiling liquid were low the total volume of the mass in the flask did not exceeding 300 ml. Upon further boiling, a more viscous gold colored liquid was produced and had a increasingly stiff, rubbery translucent appearance.

At a temperature of 149° C. (300° F.), some foaming occurred, but was of such a low volume that the total volume in the flask still did not exceed 300 ml. There was no further increase in this volume or foam height by the end of the experiment at 204° C. (400° F.).

In Example 12, substantially the same experiment of Example 11 was repeated except that the final temperature was about 316° C. (600° F.). Specifically 14 gm of cellulose acetate were dissolved in 212.5 gm of glacial acetic acid. Approximately 200 ml Ca-EDTA (0.75% $Ca^{++}$) was brought to a boil and the cellulose acetate solution was added.

EXAMPLES 13 THROUGH 16

A set of tests that was done with 100 ml of an actual radioactive calcium EDTA waste stream at a nuclear generating station in Palo Verde, Ariz. In the first of these tests, corn meal obtained under the Golden Grain brand at a local grocery store was placed into a number of 100 ml beakers in various quantities ranging from the control at zero to 25 gm/l (Example 13), 50 gm/l (Example 14), 80 gm/l (Example 15), and 150 gm/l (Example 16). All of the beakers were mixed thoroughly and placed together on a large hot plate that was preheated to near-maximum temperature. The control sample first began boiling, excess foaming occurred and sample boiled over the top at 107° C. (225° F.). The Example 15 sample was the first to boil over, followed by the control and then followed by the samples of Examples 13 and 14. The Example 16 sample never boiled over, but went to twice volume and spattered all over the hood and got very thick and gooey at 113° C. (235° F.). The temperature of each of the Examples 11–14 samples continued to 121° C. (250° F.), the liquid residue stopped boiling and the final solids had the appearance of "brownies." Clearly, the cornmeal additive suppressed the foam to such an extent that the mixture could be boiled to dryness without the formation of foam, measured by boiling over.

EXAMPLES 17 THROUGH 19

Another set of tests was done with 100 ml of the same type of radioactive calcium EDTA waste stream of Examples 13–16 using Gold Metal Brand flour as the foam suppressing additive. The concentration ranged from zero for the control to 120 gm/l (Example 17), 150 gm/l (Example 18), and 200 gm/l (Example 19). The control boiled over first, then the samples of Examples 17–19 boiled over simultaneously. Foam was observed to collapse at 113° C. (235° F.), then a thick gooey mixture was formed, followed by spattering and then the solid residue "brownies" appeared at 121° C. (250° F.) as was the case with Examples 13–16. The use of flour seemed to be slightly better as a foam suppressing additive than the cornmeal.

EXAMPLE 20 AND 21

Pilot plant runs were made in a heated screw evaporator (HSE) of the same type shown in FIG. 1 as HSE 10. These pilot plant runs were designed to duplicate the type of conditions used in the bench tests set forth above using beakers and Erlenmeyer flasks under a laboratory hood. In the pilot plant HSE, the top along the entire length of approximately 2.1 meters (8 feet) was removed to permit close observation of each run. The equipment numbers from FIG. 1 are used below for clarity. Example 20 was conducted to demonstrate a batch feed operation and Example 21 was conducted to demonstrate a continuous feed operation of the method of the present invention.

During the no additive control portion of Example 20, 500 ml of commercial grade Versene were placed in the heated trough of the HSE, i.e. a plenum chamber 15.24 cm. (6 inches) from the first flight of a screw 18. At 1420 hours, and during the first 0.61–0.76 meter (2–2.5 ft.) of HSE 10, some bubbles began to form and 1. (liter) of Versene was added. Electrical heaters 20 were set to about 260° C. (500° F.). At 1435 hours, thermocouples (not shown) were equally positioned along the trough of the HSE from feed inlet 17 to residue outlet 30 were reading about 60°–93° C. (140°–200° F.). At 1440 hours, the temperatures along the trough from right to left read about 41°, 137°, 221° C. (105°, 278°, 430° F.). At 1452 hours, an additional 1. of Versene was added and after another 9 min. the boiling was even, froth was observed on the flights at the end of screw 18 toward outlet 3 0, and the temperatures right to left read about 28°, 164°, 245° C. (82°, 327°, 473° F.). Another liter was added at 1454 hours and the temperatures read about 22°, 233°, 374° C. (72°, 452°,708° F.). Foam was observed to the 2.54–3.8 cm. (1–1.5 inch) depth about 46 cm. from the inlet end of HSE 10 and in the section of the trough reading about 163° C. (325° F.). At 1501 hours, the mid-section temperature of the trough read about 168° C. (335° F.) and a heavy smoke having an ammonia odor came from the outlet end which was reading about 517° C. (962° F.). At 1506 hours, the temperatures read about 29°, 199°, 536°, 150°, 157° C. (84°, 390°, 998°, 302°, 315° F.), the heater temperatures were set to about 593°–649° C. (1100°–1200° F.), the outlet end was dry and smoking and a thick viscous material was observed at the mid-screw. At 1512 hours, the very thick viscous material at the mid-screw was foaming at a temperature of about 168° C. (335° F.). At 1514 hours, 750 ml. of Ca-Versene were added at the mid-screw at a temperature of about 157° C. (314° F.). At 1516 hours, the mid-screw had about twice the foam as that before the Ca-Versene and the temperatures read about 1160° C. (320° F.). At 1530 hours, 750 ml. of Ca-Versene had been added at the mid-screw at a temperature of about 159° C. (318° F.) and the foam was up to the bottom of shaft 26. At 1532 hours, 800 ml. of Ca-Versene were added at the mid-screw and the foam was over shaft 26. At 1549 hours, flights 28 adjacent outlet 30 still had thick viscous, i.e. gooey, deposits on the internals of HSE 10 and had a thin, light-colored, bubbly deposit which were believed to contain calcium carbonate closest to shaft 26. FIG. 2 illustrates this harmful build-up of deposits prior to the introducing the foam suppressing additives of the present invention in HSE 10 with the top in place. At 1600 hours, the temperatures read about 43°, 227°, 552°, 227°, 419° C. (109°, 440°, 1027°, 442°, 787° F.), no liquid remained in HSE 10, the foam build-up remained substantially the same as at 1549 hours and smoking occurred at each end of HSE 10.

The control run demonstrated that the HSE could not be operated on a batch run basis for even 2 hours without having to shutdown the entire operation to remove the harmful build-up of foam and other deposits on the screw flights and other HSE internals. The control run also demonstrated that a waste stream containing Ca-Versene resulted in a greater build-up of foam than one containing straight Versene (45% EDTA/55% water).

Example 20 one or more additives were introduced in accordance with the method of the present invention. At 1611 hours, 1 hours and 51 minutes after the start of the control portion of the pilot plant run, 10 l. of an emulsion of a foam suppressing additive was added to HSE 10 via agitated vessel 11. The emulsion consisted of 360 gm. of Gold Metal Brand flour combined with 3 l. of Ca-Versene. Between 1611 and 1611 hours, the foam that had built-up during the control run quickly collapsed into a fluid, gooey liquid. At 1612, the contents in HSE 10 was a foam-less semi-solid material having the appearance of cake batter. At 1618, as the batter became thicker, spattering was observed on the side walls of HSE 10 and on the top of screw 18. At this time the batter had a depth of 0.38 cm (1 inch) and the spatter was up to a height of 2.8 cm (7 inches). At 1622 hours, the batter appeared dry, was smoking heavily without spattering and the temperatures read about 42°, 236°, 513°, 183°, 388° C. (107°, 456°, 956°, 361°, 731° F.). By 1633 hours, the foam suppressing additive appeared to have reduced all build-up on the flights of screw 18 to a height in the range of about 0.2 to about 0.3 cm (½-¾ inch). At 1645, another addition of foam suppressing emulsion was added to HSE 10 via vessel 11. This emulsion consisted of a mixture of the two additives: 200 g of the same brand of flour and 40 g of cellulose acetate in 2 l. of Ca-Versene such that the total combined percentage was about 9 wt. % in the total waste stream. In one minute after this addition, there was a very rapid boiling of liquid over shaft 26 which lasted approximately 40 seconds. At this time the boiling stopped and the batter in HSE 10 thickened with the onslaught of spattering for about 1 min. The use of cellulose acetate in the foam suppressing additive appeared to favorably decrease the volume of spatter and the spatter height, e.g. only 1.57 cm (4 inches) instead of 2.8 cm (7 inches) on the HSE 10 internals. Finally at 1649 hours with some smoking from the mid-section of HSE 10, a few squirts of water from a spray bottle were effective to clean the spatter residue from the side walls of HSE 10. This pilot plant run successfully demonstrated the commercial viability of method of the present invention for the suppression of foam in the processing of liquids streams that were heretofore impossible to run without frequent shutdowns for the removal of deposits of solid crust on the screw flights and internals of the processing equipment.

As shown in FIG. 1, HSE 10 included a steam manifold which in the these pilot plant runs consisted a 0.1 cm (¼ inch) diameter tubing having of 11 holes, which served as steam jets, equally positioned along its 25.4 cm (10 inch) length. The holes were directed down onto the screw flights to test the concept of the steam removal of any spatter build-up using steam at a pressure of 3.4 atmospheres (50 psi). Example 21 began at 1335 hours on the day after the successful batch run of Example 20, with the preparation in agitated vessel 11 of a feed emulsion of 1.36 kg (30 lb) of Versene and 0.136 (3 lb) of the same brand of flour used in Example 20. At 1340 hours, a continuous feed of the emulsion to HSE 10 began at a rate of 227 kg (0.5 lb) per min. with the steam manifold being operated on a cycle of 20 seconds on and 30 seconds off. At this time, the temperature profile from the feed inlet to the outlet read 33°, 195°, 477°, 231°, 292° C. (92°, 383°, 893°, 448°, 557° F.). At 1345 hours enough of the liquid emulsion had been fed to the HSE that a build-up of about 0.3 cm (¾ inch) was visible at the bottom of screw 18 and some foam spatter appeared on the side wall. At 1350 hours, the flights under and in the vicinity of the steam manifold remained free of foam spatter, but the flights outside of a steam zone began to coat with the same type of batter observed in Example 20. By 1400 hours, the foam had travelled about 91 cm 36 inches) along the length of HSE 10 and was smoking. At 1405, HSE 10 had the profile shown in FIG. 3 with the first 30.48 cm (12 inches) of travel of the feed was in the form of a lightly boiling batter having a height in the range of about 0.2 to about 0.3 cm (½-¾ inch), the second 30.48 cm (12 inches) of travel was in the form of a foam having a height of about 0.6 cm (1.5 inches) and the third 30.48 cm (12 inches) of travel was in the form of a buttery material having a height of about 0.3 cm (0.75 inch). At 1435, the feed rate of 227 kg (0.5 lb) per min. was doubled to 454 kg. (1 lb) per min. In 5 min. thereafter, the foam increased in the mid-section to about 5.1 cm (2 inches). At 1442 hours, the temperature profile from the feed inlet to the outlet read about 56°, 195°, 433°, 116°, 572°, 33° C. (133°, 383°, 813°, 240°, 1061°, 91° F.). The pilot plant run was terminated at 1500 hours or 1 hour and 20 minutes after the start of the continuous feed in which the first section of the HSE was boiling, and the second and third sections of the HSE contained a foam-less batter without a build-up of spatter on the internals. The run demonstrated the successful operation of the method of the present invention in which a difficult to process waste feed can be processed at a commercially viable feed rate.

EXAMPLES 22

Prior to the implementation of the method of the present invention, the operation of the commercial Ca-EDTA waste stream processing unit, HSE 10, at the Palo Verde Nuclear Generating Station was limited to only 136 gm (0.3 lb) to 182 gm (0.4 lb) per min. for the HSE. The commercial heated screw evaporator was 17.8 cm (7 in) in diameter and 4.9 m (16 feet) in length. The radioactive Ca-EDTA waste stream was heated to 149° C.(300° F.) prior to the input of feed into the HSE to reduce its viscosity. When the feed rate was increased, plugging of screw 18 with radioactive waste resulted. This required costly and high risk major cleaning of the screw.

The commercial operation was quickly increased to a feed rate of 227 gm (0.5 lb) to 341 gm (0.75 lb) of radioactive Ca-EDTA waste stream per min by the addition of flour at the 5 to 10 % mass level to each of the commercial HSE units, one of which is described under the above DETAILED DESCRIPTION OF THE INVENTION in reference to FIGS. 1 and 2. This feed rate was limited by the ability to properly disperse the flour in the waste stream and the optimum placement of steam jets 38 of steam manifold 37 to clean spatter 33 from side walls 34 above screw 18 in foam section 24. The temperature profile over the four zones of HSE 10 during this operation, i.e., boiling zone 23, the foaming zone 24, the drying zone 25 and the solids output zone adjacent solids outlet 30, were respectively 138°, 232°, 343°, 566° C. (280°, 450°, 650° and 1050° F.). This operation demonstrated that one can accomplish increased throughput, lower maintenance, and in-situ cleaning operations without the removal of screw 18 in comparison to the operation of the HSE prior to the implementation of the method of the present invention.

The pilot plant studies using the heated screw evaporator (12.7 cm (5 in) in diameter and 3.05 m (10 feet) in length) as set forth under the above Examples 20 and 21, the waste stream feed rate was 454 gm (1.0 lb) per min. The proper placement of steam jets 38 of steam manifold 37 in the commercial Palo Verde HSE will allow the waste feed rate to be increased to at least about 681 gm (1.5 lb) per min. for each screw. Such improvements will allow economically successful operation of commercial processing of all types of radioactive and other waste stream applications.

Various other embodiments and aspects of the present invention will occur to those skilled in the art without departing from the spirit or scope of the invention. Having thus described the present invention, what is now deemed appropriate for Letter Patent is set forth in the following appended claims.

What is claimed is:

1. A method for the suppression of foams during the processing of streams containing waste materials which comprises
   (a) introducing an additive powder into a waste stream comprising diammonium ethylenediaminetetraacetic acid at a concentration in the range of 0.5% to 20% by weight, said additive having the stability to withstand thermal and chemical degradation during the processing;
   (b) processing said waste stream for a period of time at a temperature in the range of about 95° C. (203° F.) and about 760° C. (1400° F.), wherein a foam of said waste stream has the tendency of forming;
   (c) suppressing the formation of said foam by at least a portion of said additive powder in the form of particles having a size in the range substantially less than 100 μm where the additive powder is suspended in the liquid cells between bubbles that make up the foam structure, where the particles act as ionic or polar sites to attract and neutralize surfactants creating foam, and any remaining portion of said additive being solubilized in the waste stream to such an extent that said particles do not coagulate and precipitate out of solution; and
   (d) removing said waste containing a substantial reduction of foam.

2. The method of claim 1 wherein said powder is selected from the group consisting of sawdust, corn meal, flour, titanium dioxide, molybdenum disulfide, sand fines, grinding compounds, clays, polishing compounds, cellulose acetate and mixtures thereof.

3. The method of claim 2 wherein the powder is emulsified with a portion of said waste stream.

4. The method of claim 3 wherein the concentration of powder in said emulsion is no greater than about 70% by weight.

5. The method of claim 1 wherein the pressure ranges from about 50 kPa to about 3000 kPa.

6. The method of claim 1 wherein the pressure ranges from about 70 kPa to about 150 kPa.

7. A method for the suppression of foams in the stream reforming of waste streams which comprises:
   (a) introducing an additive powder into a waste stream comprising diammonium ethylenediaminetetraacetic acid, said additive selected from the group consisting of sawdust, corn meal, flour, titanium dioxide, molybdenum disulfide, said fines, grinding compounds, clays, polishing compounds, cellulose acetate and mixtures thereof, wherein said additive is emulsified with at least a portion of said waste stream, the resulting emulsion having a concentration of up to 70% by weight of said additive.
   (b) steam reforming said waste stream in a steam reforming vessel at a temperature in the range of about 230° C.(450° F.) to about 760° C. (1400° F.), a pressure in the range of about 70 kPa, to about 150 kPa, wherein a foam of said waste stream has the tendency of forming, and a concentration of said additive in said waste stream in the range of about 0.5% to about 30% by weight;
   (c) suppressing the formation of said foam by at least a portion of said additive powder in the form of particles having a size in the range substantially less than 100 μm where the additive powder acts as sites to attract and neutralize surfactant materials creating foam, where the additive powder is suspended in liquid cells between bubbles that make up the foam structure, and where the particles act as ionic or polar sites to attract and neutralize surfactants creating foam, and any remaining portion of said additive being solubilized in the waste stream to such an extent that particles do not coagulate and precipitate out of solution; and
   (d) recovering said solid waste residue containing a substantial reduction of foam.

8. The method of claim 7 wherein said emulsion is introduced in one end of an agitated steam reforming vessel and the resulting solid waste residue is removed from the other end of said vessel.

9. The method of claim 8 wherein the steam reforming vessel is agitated by means of a screw.

10. The method of claim 9 wherein the steam reforming vessel is equipped with pressurized gas means for removing any spatter on the screw of said vessel.

11. The method of claim 7 wherein the steam reforming vessel is equipped with pressurized gas means for removing any spatter on the internals of said vessel.

12. The method of claim 11 wherein said pressurized gas selected from the group consisting of steam, steam/air, natural gas and recycled syngas.

13. The method of claim 12 wherein said additive is flour.

14. The method of claim 7 wherein said additive is flour.

* * * * *